United States Patent
Kois et al.

(10) Patent No.: US 10,437,683 B1
(45) Date of Patent: Oct. 8, 2019

(54) SYSTEMS AND METHODS FOR PROTECTING DATA AFFECTED BY SYSTEM CHANGES

(71) Applicant: Symantec Corporation, Mountain View, CA (US)

(72) Inventors: Alex Kois, Tallinn (EE); Roman Vassiljev, Tallinn (EE)

(73) Assignee: Symantec Corporation, Mountain View, CA (US)

( * ) Notice: Subject to any disclaimer, the term of this patent is extended or adjusted under 35 U.S.C. 154(b) by 199 days.

(21) Appl. No.: 15/615,070

(22) Filed: Jun. 6, 2017

(51) Int. Cl.
*G06F 11/14* (2006.01)

(52) U.S. Cl.
CPC ...... *G06F 11/1451* (2013.01); *G06F 11/1471* (2013.01); *G06F 11/1446* (2013.01)

(58) Field of Classification Search
CPC ............. G06F 11/1471; G06F 11/1446; G06F 11/1451
USPC .......................................... 717/121, 168–178
See application file for complete search history.

(56) References Cited

U.S. PATENT DOCUMENTS

| | | | | |
|---|---|---|---|---|
| 7,287,068 B1* | 10/2007 | Eriksson | ................... | G06F 8/65 709/219 |
| 7,703,090 B2* | 4/2010 | Napier | ...................... | G06F 8/62 709/221 |
| 8,332,842 B2* | 12/2012 | Bauer | ................. | G06F 11/1433 717/120 |
| 8,943,492 B2* | 1/2015 | Scian | ...................... | G06F 8/658 717/171 |
| 2002/0100036 A1* | 7/2002 | Moshir | ...................... | G06F 8/62 717/173 |
| 2004/0060044 A1* | 3/2004 | Das | ......................... | G06F 8/65 717/171 |
| 2010/0125841 A1* | 5/2010 | Bauer | ................. | G06F 11/1433 717/174 |
| 2011/0214116 A1* | 9/2011 | Vidal | ........................ | G06F 8/65 717/173 |
| 2013/0132942 A1* | 5/2013 | Wang | ....................... | G06F 8/61 717/176 |
| 2014/0259009 A1* | 9/2014 | Bhattiprolu | ............... | G06F 8/61 717/174 |
| 2014/0337285 A1* | 11/2014 | Gokhale | ............. | G06F 11/1464 707/610 |

* cited by examiner

*Primary Examiner* — Marina Lee
(74) *Attorney, Agent, or Firm* — FisherBroyles, LLP (57) ABSTRACT

The disclosed computer-implemented method for protecting data affected by system changes may include (i) receiving, at an installation application, a request to perform a system change on an endpoint computing device, (ii) identifying, via the installation application, one or more data items currently installed on the endpoint computing device that will be modified when the system change is performed, (iii) using the installation application to protect the data items such that the system change becomes revertible, and (iv) after protecting the data items, using the installation application to perform the system change. Various other methods, systems, and computer-readable media are also disclosed.

20 Claims, 6 Drawing Sheets

SYSTEMS AND METHODS FOR PROTECTING DATA AFFECTED BY SYSTEM CHANGES

BACKGROUND

Generally, it is recommended to perform a backup on an endpoint device prior to allowing an application to perform a critical system change. In some instances, an application may be integrated with third-party backup software and may automatically request a backup prior to performing critical changes. In one example, the application may only allow critical changes after a backup has been performed.

However, automatically initiating a backup in this way may cause several problems if, for example, (i) the endpoint device does not already have backup software installed or (ii) the application does not know which backup software is installed on the endpoint and/or how to initiate the backup. If the endpoint device does have backup software installed, the installed backup software may be too general and/or too heavy for the backup needed prior to performing the system change. For example, the application may indicate that a few specific files, scattered among several folders, need to be backed up prior to performing the system change. However, the software currently installed on the endpoint may only be configured to perform backups by folder and/or drive. In light of all this, the instant disclosure identifies and addresses a need for improved systems and methods for protecting data prior to performing critical system changes.

SUMMARY

As will be described in greater detail below, the instant disclosure describes various systems and methods for protecting data affected by system changes. In one example, a computer-implemented method for protecting data affected by system changes may include (i) receiving, at an installation application, a request to perform a system change on an endpoint computing device, (ii) identifying, via the installation application, one or more data items currently installed on the endpoint computing device that will be modified when the system change is performed, (iii) using the installation application to protect the data items such that the system change becomes revertible, and (iv) after protecting the data items, using the installation application to perform the system change.

In one embodiment, the installation application protects the data items by creating, on the endpoint computing device, a container. This contain may include, without limitation, (i) a list of the data items, (ii) a local backup of the data items, and/or (iii) meta-information relating to the data items. In one embodiment, after the installation application creates the container, a third-party backup system installed on the endpoint computing device may include the data items in a general backup in response to obtaining the data items from the container.

In one example, the data items may include (i) a file, (ii) a data block, (iii) metadata, and/or (iv) system data. In one embodiment, the request to perform the system change may include a request to install new software. Additionally or alternatively, the request to perform the system change may include a request to install an update to existing software.

In some examples, identifying the data items that will be modified when the system change is performed may include (i) obtaining one or more packages to be installed as part of the system change, (ii) identifying a list of data items contained in each of the one or more packages, and (iii) determining, for each data item within the list of data items, whether the data item already exists on the endpoint computing device. Additionally, in one embodiment, the disclosed systems and methods may include installing the one or more packages using a dry-run operation that installs the one or more packages in dry-run mode. In this embodiment, the dry-run operation may return a list of one or more dependent packages and the disclosed systems and methods may further include (i) identifying a list of data items contained in each of the one or more dependent packages and (ii) determining, for each data item within the list of data items contained in each of the one or more dependent packages, whether the data item already exists on the endpoint computing device.

In additional or alternative examples, identifying the data items that will be modified when the system change is performed may include identifying a package installation scriptlet that identifies data items that will be affected by the system change. In one embodiment, after the installation application performs the system change, a restoration process may revert the system change by copying each data item within the protected identified data items to its original location.

In one embodiment, a system for implementing the above-described method may include (i) a receiving module, stored in memory, that receives, at an installation application, a request to perform a system change on an endpoint computing device, (ii) an identification module, stored in memory, that identifies, via the installation application, one or more data items currently installed on the endpoint computing device that will be modified when the system change is performed, (iii) a protection module, stored in memory, that uses the installation application to protect the data items such the system change becomes revertible, (iv) a change module, stored in memory, that, after the protection module protects the data items, uses the installation application to perform the system change, and (v) at least one physical processor configured to execute the receiving module, the identification module, the protection module, and the change module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) receive, at an installation application, a request to perform a system change on an endpoint computing device, (ii) identify, via the installation application, one or more data items currently installed on the endpoint computing device that will be modified when the system change is performed, (iii) use the installation application to protect the data items such the system change becomes revertible, and (iv) after protecting the data items, use the installation application to perform the system change.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for protecting data affected by system changes. As will be discussed in greater detail below, the disclosed systems and methods propose an integration point that allows the integration of lightweight and/or domain-specific backups into general purpose backup systems. In some examples, an installation application may utilize such an integration point prior to making critical system changes. In one embodiment, these systems and methods may employ a "reverse of control" principle. Instead of having an installation application call a third-party backup application to create a backup of data, the installation application may prepare a container with backed up data and instructions for the data.

By preparing a lightweight container that saves a copy of the data that will be affected by a system change, the systems and methods described herein may effectively protect such data without initiating a backup that may be too general (e.g., without initiating a full backup when only a handful of files need to be backed up). In addition, the systems and methods described herein may improve the functioning of a computing device by facilitating backups of data affected by a system change prior to the system change occurring that are lightweight and efficient enough to not slow down a computing system as the computing system is attempting to perform a system change.

Figure 1:
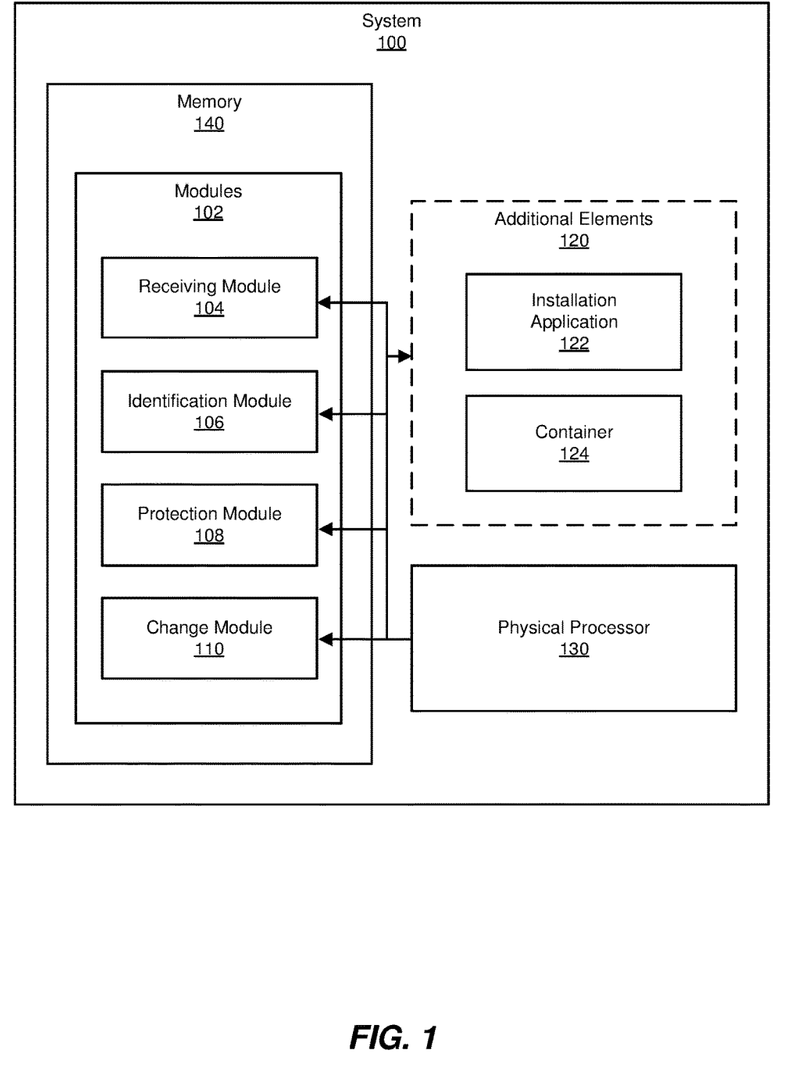
FIG. 1 is a block diagram of an example system for protecting data affected by system changes.
Figure 2:
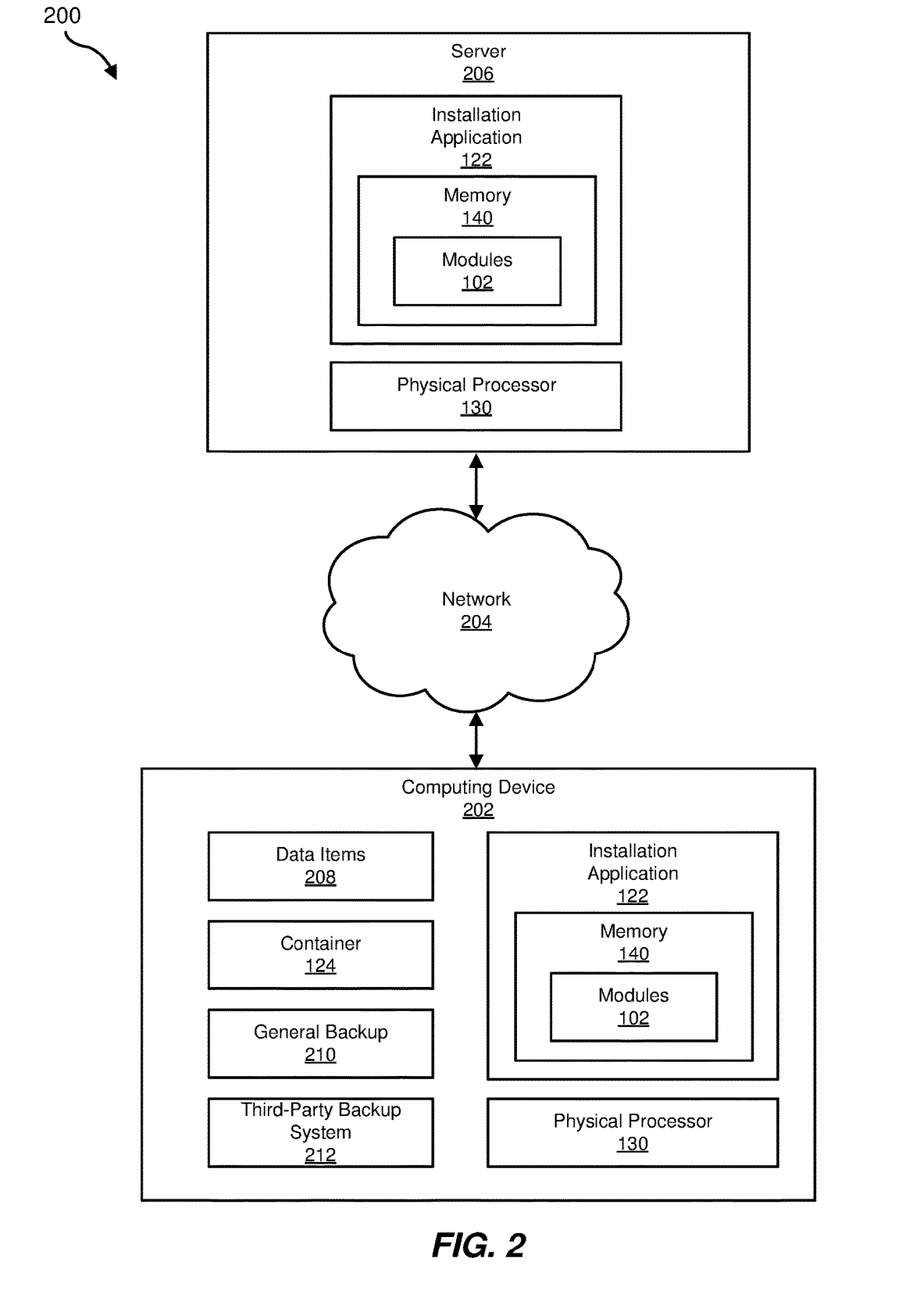
FIG. 2 is a block diagram of an additional example system for protecting data affected by system changes.
Figure 3:
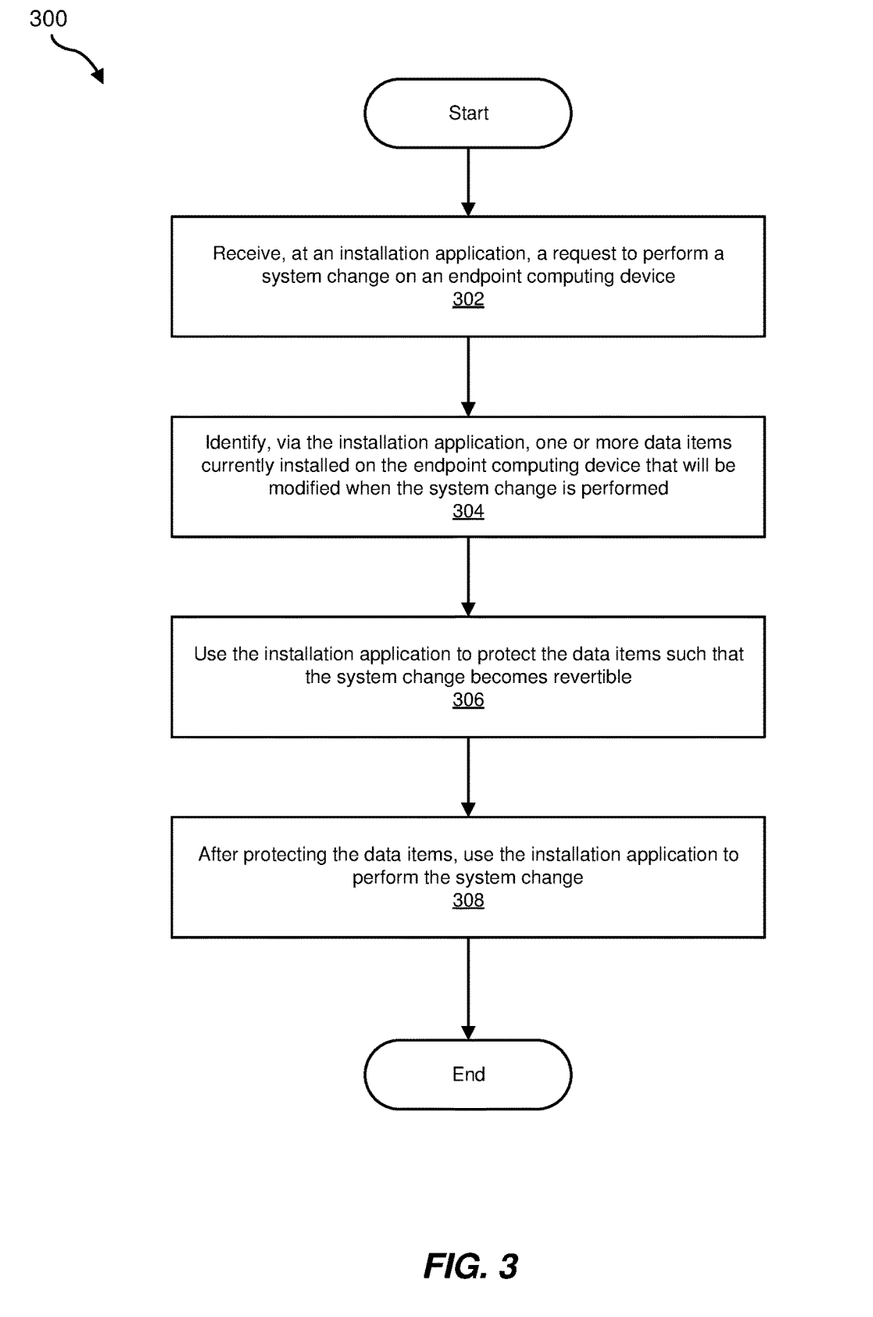
FIG. 3 is a flow diagram of an example method for protecting data affected by system changes.
Figure 4:
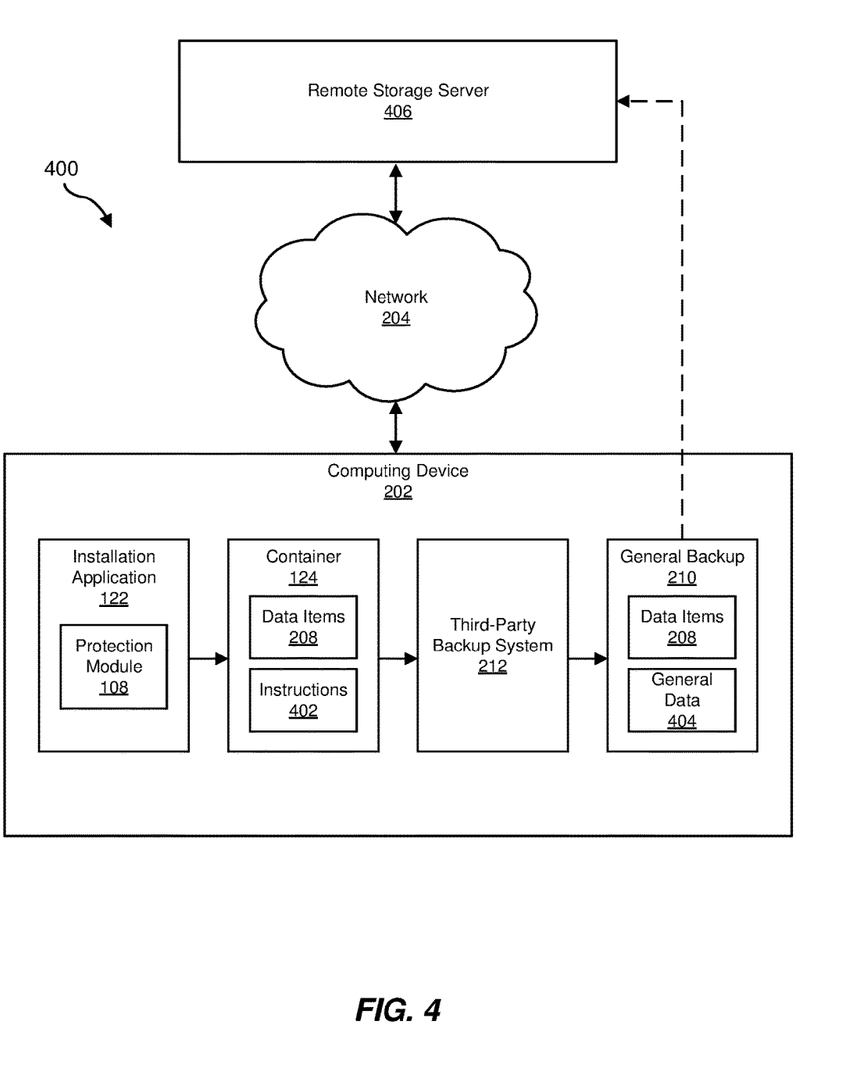
FIG. 4 is a block diagram of an example system for creating a container of digital items affected by a system change.

The following will provide, with reference to FIGS. 1-2 and FIG. 4, detailed descriptions of example systems for protecting data affected by system changes. Detailed descriptions of corresponding computer-implemented methods will also be provided in connection with FIG. 3. In addition, detailed descriptions of an example computing system and network architecture capable of implementing one or more of the embodiments described herein will be provided in connection with FIGS. 5 and 6, respectively.

FIG. 1 is a block diagram of example system 100 for protecting data affected by installation packages. As illustrated in this figure, example system 100 may include one or more modules 102 for performing one or more tasks. For example, and as will be explained in greater detail below, example system 100 may include a receiving module 104 that receives, at an installation application, a request to perform a system change on an endpoint computing device. Example system 100 may additionally include an identification module 106 that identifies, via the installation application, one or more data items currently installed on the endpoint computing device that will be modified when the system change is performed. Example system 100 may also include a protection module 108 that uses the installation application to protect the data items such the system change becomes revertible. Example system 100 may further include a change module 110 that uses the installation application to perform the system change. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks. In one example, module 102 may operate as part of an installation package, such as installation application 122.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate protecting data affected by system changes. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more additional elements 120, such as installation application 122 and container 124. Installation application 122 generally represents any type or form of computer program that causes a computing system to perform useful tasks relating to the installation of a new application and/or a software update. Container 124 generally represents any type or form of data structure capable of maintaining a list of data items that will be affected by a system update, a local backup of such data items, meta-information relating to such data items, and/or instructions for backing up such data items as part of a general backup.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system.

As will be described in greater detail below, one or more of modules 102 from FIG. 1 may, when executed by at least one processor of computing device 202 and/or server 206, enable computing device 202 and/or server 206 to protect data affected by system changes. For example, and as will be described in greater detail below, receiving module 104 may receive, at installation application 122, a request to perform a system change on an endpoint computing device (such as computing device 202). Identification module 106 may identify, via installation application 122, one or more data items 208 currently installed on the endpoint computing device (e.g., computing device 202) that will be modified when the system change is performed. Protection module 108 may use installation application 122 to protect data items 208 such that the system change becomes revertible. Then, change module 110 may use installation application 122 to perform the system change.

Computing device 202 generally represents any type or form of computing device capable of reading computer-executable instructions. In one example, computing device 202 may represent an endpoint device about to experience a system change (e.g., a system change resulting from executing an installation package received from server 206). Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, variations or combinations of one or more of the same, and/or any other suitable computing device.

Server 206 generally represents any type or form of computing device that is capable of deploying system changes to endpoint devices (e.g., by deploying installation packages to endpoint devices). Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Data items 208 generally represent any type or form of data unit stored on computing device 202. For example, data items 202 may represent a group of files, data blocks, metadata, and/or system data. General backup 210 generally represents any type or form of general backup of computing device 202 performed by a third-party backup application, such as third-party backup system 212. Third-party backup system 212 generally represents any type or form of backup system that performs general-purpose backups of computing device 202. In some examples, third-party backup system 212 may only be configured to perform backups by folder and/or drive. In one embodiment, third-party backup system 212 may be scheduled to perform general backups of computing device 202 at regular intervals. In this embodiment, general backup 210 may represent a backup that is performed at one of the regularly scheduled intervals, as opposed to representing a backup that is performed prior to a system change for the purpose of protecting data that may be affected by the system change.

FIG. 3 is a flow diagram of an example computer-implemented method 300 for protecting data affected by system changes. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may receive, at an installation application, a request to perform a system change on an endpoint computing device. For example, receiving module 104 may, as part of computing device 202 in FIG. 2, receive, at installation application 122, a request to perform a system change on computing device 202.

Receiving module 104 may receive a variety of types of requests. In some examples, receiving module 104 may receive a request to install new software on computing device 202 (e.g., software received from server 206). Additionally or alternatively, receiving module 104 may receive a request to install an update to existing software (e.g., an update received from server 206). In one example, receiving module 104 may receive the request to perform the system change from server 206.

At step 304, one or more of the systems described herein may identify, via the installation application, one or more data items currently installed on the endpoint computing device that will be modified when the system change is performed. For example, identification module 106 may, as part of computing device 202 in FIG. 2, identify, via installation application 122, one or more data items 208 currently installed on computing device 202 that will be modified when the system change is performed. Because installation application 122, as the application that is to perform the system change, has access to what data will be changed by the system change, installation application 122 may identify such data (and, as will be discussed in connection with step 306, may create a backup of such data) with minimal performance impact.

Identification module 106 may identify data items 208 in a variety of ways. In one example, identification module 106 may identify data items 208 based on package contents. For example, identification module 106 may obtain (e.g., from server 206) one or more packages to be installed as part of the system change and may identify a list of data items included in the packages. Then, identification module 106 may determine which of the data items included in the list of data items already exist on computing device 202. For each data item that currently exists on computing device 202, the existing data item may be copied to a local backup folder, as will be described in greater detail in connection with step 306 below.

In one embodiment, after obtaining the one or more packages, identification module 106 may install the one or more packages using a dry-run operation that installs the packages in dry-run mode and returns a list of one or more dependent packages. In this example, identification module 106 may also obtain a list of data items contained in each of the dependent packages and may determine, for each item within the list of data items contained in the dependent packages, whether the data item already exists on computing device 202. If the data item does currently exist on computing device 202, the existing data item may be copied to a local backup folder, as will be described in greater detail in connection with step 306 below.

In additional or alternative examples, identification module 106 may identify data items 208 by identifying and analyzing a package installation scriptlet (e.g., received from server 206 along with the request to perform the system change) that identifies the data items that will be affected by the system change. As a specific example, identification module 106 may identify and analyze RPM package installation scriptlets. In these examples, identification module 106 may identify which of the data items identified in the package installation scriptlet already exist on computing device 202. The data items that already exist on computing device 202 may, as will be described in greater detail below in connection with step 306, be copied to a local backup folder. In some examples, identification module 106 may also identify one or more files (e.g., system files) that are known to always or commonly be affected by system changes. To give a specific example, identification module 106 may identify an RPMDB file located in /var/lib/rpmdb/ based on a policy that instructs identification module 106 to always identify the RPMDB file when identifying data items that will be modified by a system change.

At step 306, one or more of the systems described herein may use the installation application to protect the data items such that the system change becomes revertible. For example, protection module 108 may, as part of computing device 202 in FIG. 2, use installation application 122 to protect data items 208 such that the system change becomes revertible.

Protection module 108 may protect data items 208 in a variety of ways. In some examples, protection module 108 may copy data items 208 to a local backup folder in a file system of computing device 202. For example, a snapshot of data items 208 may be saved to a backup folder. To give a specific example, a snapshot of an RPMDB file located in /var/lib/rpmdb/ may be saved to a backup folder.

In some examples, protection module 108 may protect data items 208 by creating a container (e.g., container 124), as illustrated in FIG. 4. FIG. 4 illustrates a system 400 in which protection module 108, operating as part of installation application 122, creates a container 124 to be later provided to third-party backup system 212. In some examples, as shown in FIG. 4, third-party backup system 212 may (e.g., as part of performing a routine scheduled backup) include data items 208, obtained from container 124, to general backup 210 (e.g., along with general data 404 being stored in general backup 210 as part of the routine scheduled backup).

Container 124 may include a variety of information. In some examples, container 124 may contain a list of data items 208, a local backup of data items 208, and/or meta-information relating to data items 208. In one embodiment, as shown in FIG. 4, container 124 may include instructions 402 for a third-party backup system, such as third-party backup system 212. In some examples, instructions 402 may include information describing a folder structure and/or file content of data items 208.

Additionally or alternatively, instructions 402 may include meta-information that may be useful for third-party backup system 212 when third-party backup system 212 is selecting a backup strategy for data items 208. For example, the meta-information may describe whether a data item in data items 208 has a high uniform distribution (e.g., whether the data item is compressed and/or encrypted), or how the data item's content may change over time (e.g., the data may only grow, the data may change on a fixed-block basis, data blocks may be inserted and/or deleted from the content, and growth patterns may be totally random and/or unpredictable). Thus, when third-party backup system 212 performs a general backup (e.g., according to a regular backup schedule of third-party backup system 212), third-party backup system 212 may receive data items 208 (and, in some embodiments, instructions 402) from container 124 and include a copy (e.g., snapshot) of data items 208 (e.g. according to instructions 402) in its general backup 210 along with the regular data backed up in general backup 210 (i.e., general data 404).

In some examples, third-party backup system 212 may select to either (i) ignore container 124 and perform its backup according to its own logic or (ii) process container 124 and integrate the local backup of data items 208 included in container 124 in its own backup structure. In examples in which files are large (e.g., RPMDB files) but the system change will modify only a small part of a set of large files, a delta backup (e.g., a reverse delta backup with xor delta coding) may be implemented (e.g., using a full-size backup of the latest backups and only small delta blocks for all previous backups).

In one example, after third-party backup system 212 has integrated data items 208 from container 124 into general backup 210, third-party backup system 212 may compare data items 208 to other backup data in general backup 210 and/or a previous backup. If storing a backup of data items 208 creates redundant data, third-party backup system 212 may delete certain data (either the data received from container 124 or the redundant data included in the other backup data) to eliminate the redundancy in general backup 210.

In one example, container 124 may represent a local backup of data items 208. In some examples, general backup 210 may also represent a local backup. In other examples, third-party backup system 212 may transmit general backup 210 to a remote storage server 406 as a remote backup. In one embodiment, computing device 202 may not include a general-purpose backup system, such as third-party backup system 212. In this example, the instant disclosure may provide at least minimum support for a restore operation by creating the minimal local backup of data items 208 (e.g., by creating container 124).

Returning to FIG. 3, at step 308, one or more of the systems described herein may, after protecting the data items, use the installation application to perform the system change. For example, change module 110 may, as part of computing device 202 in FIG. 2, after protection module 108 has protected data items 208, use installation application 122 to perform the system change.

In some examples, after change module 110 has performed the system change, a restoration process on computing device 202 may receive a request to restore computing device 202 to a previous state (e.g., in response to computing device 202 experiencing a system failure caused by the system change). In these examples, the restoration process may revert the system change by copying each data item within data items 208 (e.g., as saved in general backup 210 and/or in container 124) to its original location on computing device 202.

As explained above in connection with example method 300 in FIG. 3, the disclosed systems and methods may facilitate saving files that will be modified during an installation operation (e.g., a software installation or update) to render the installation operation revertible. In some examples, a disclosed process for saving the files that will be modified may include (i) obtaining a package (or list of packages) to be installed and (ii) installing the package (or packages) in dry-run mode. In one example, installing the package in dry-run mode may not make any changes in the system, but may return a list of dependent packages. Then, (iii) for each package in the list of resolved packages, the disclosed process may include obtaining a list of files that the package contains. The disclosed systems and methods may then (iv) check to see if (e.g., for each file within the list of files) a file with the same name already exists on the file system. If such a file does exist, the existing file may be copied to a local backup folder. For example, a snapshot of such files may be saved to a backup folder. Additionally, in some examples, the disclosed systems and methods may identify system files that may be modified during an installation (e.g., an RPMDB file located in /var/lib/rpmdb/) and save the identified system files to the backup folder. Then, the package (or packages) may be installed (this time not in dry-run mode). Later, if a rollback is needed, the disclosed systems and methods may also include copying the saved files to their original locations.

In one embodiment, the disclosed systems and methods may include analyzing package installation scriptlets (e.g., RPM package installation scriptlets) to identify backup files that may be touched by an installation. In examples in which files are large (e.g., RPMDB files) but each update modifies only a small part of a set of large files, a delta backup (e.g., a reverse delta backup with xor delta coding) may be implemented (e.g., using a full-size backup of the latest backups and only small delta blocks for all previous backups). In some examples, the disclosed systems and methods may be implemented in Red Hat Linux family systems.

In one example, the disclosed systems and methods may provide an integration point for a third-party backup system. In this example, instead of calling a third-party application to make a backup of data to be changed prior to performing a system change, the disclosed systems and methods may prepare a container with backed up data and instructions. An application that makes changes in a system knows exactly what data may be changed, and, as such, may make a local copy of such data with minimal performance impact.

Then, the application may leave a file, such as a waymark file, in a file system (e.g., something like a robots.txt file for web crawlers). In some examples, the waymark file may contain information relating to the local backed-up data. In some embodiments, this information may include a folder structure and/or file content of the local backed-up data. Additionally or alternatively, this information may include meta-information that may be useful in choosing a best backup strategy for files in the local backup. For example, the meta-information may describe whether the file has high uniform distribution (e.g., compressed or encrypted) or how file content may change over time (e.g., data may only grow, data changes on a fixed-block basis, data blocks may be inserted and/or deleted from content, and/or totally random and/or unpredictable growth patterns).

Later, when a backup application encounters the waymark file, the backup application may ignore the waymark file and perform its backup according to its own logic. Or, the backup application may process the waymark file and integrate local backups into its own backups structure. To give a specific example, after a waymark file is created, a global backup system may, as it is creating revisions for each snapshot in a backup, encounter a waymark file that has two local backups, which were performed after the last global backup. In this specific example, the global backup system may create, on-the-fly, additional snapshots with changes from the two local backups. From the perspective of an end-user, it may appear that the global backup was launched before each system update operation, with revisions from the two local backups being indistinguishable from the other revisions. Then, after integration, the global backup system may delete additional snapshots with changes from the two local backups. Thus, the disclosed systems and methods may have minimum performance impact to create the local backups. Later, if the endpoint has installed general-purpose backup software, the local backups may be natively merged into the global backup system. If the endpoint does not have general purpose backup software installed, at least there will be some minimum support for the restore operation.

Figure 5:
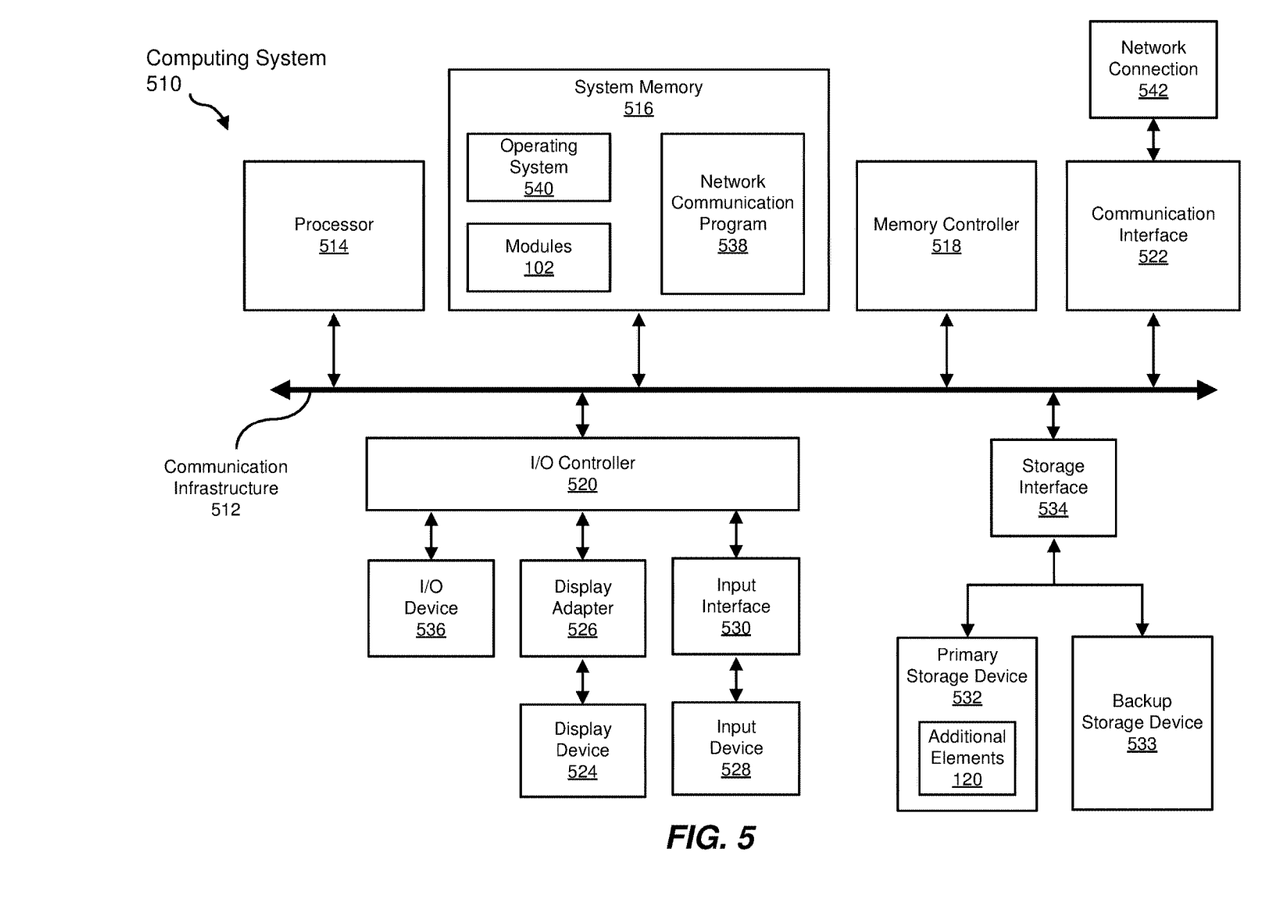
FIG. 5 is a block diagram of an example computing system capable of implementing one or more of the embodiments described and/or illustrated herein.

FIG. 5 is a block diagram of an example computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the example embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In some examples, system memory 516 may store and/or load an operating system 540 for execution by processor 514. In one example, operating system 540 may include and/or represent software that manages computer hardware and software resources and/or provides common services to computer programs and/or applications on computing system 510. Examples of operating system 540 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

As illustrated in FIG. 5, computing system 510 may also include at least one display device 524 coupled to I/O controller 520 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, example computing system 510 may also include at least one input device 528 coupled to I/O controller 520 via an input interface 530. Input device 528 generally represents any type or form of input device capable of providing input, either computer or human generated, to example computing system 510. Examples of input device 528 include, without limitation, a keyboard, a pointing device, a speech recognition device, variations or combinations of one or more of the same, and/or any other input device.

Additionally or alternatively, example computing system 510 may include additional I/O devices. For example, example computing system 510 may include I/O device 536. In this example, I/O device 536 may include and/or represent a user interface that facilitates human interaction with computing system 510. Examples of I/O device 536 include, without limitation, a computer mouse, a keyboard, a monitor, a printer, a modem, a camera, a scanner, a microphone, a touchscreen device, variations or combinations of one or more of the same, and/or any other I/O device.

Communication interface 522 broadly represents any type or form of communication device or adapter capable of facilitating communication between example computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

In some examples, system memory 516 may store and/or load a network communication program 538 for execution by processor 514. In one example, network communication program 538 may include and/or represent software that enables computing system 510 to establish a network connection 542 with another computing system (not illustrated in FIG. 5) and/or communicate with the other computing system by way of communication interface 522. In this example, network communication program 538 may direct the flow of outgoing traffic that is sent to the other computing system via network connection 542. Additionally or alternatively, network communication program 538 may direct the processing of incoming traffic that is received from the other computing system via network connection 542 in connection with processor 514.

Although not illustrated in this way in FIG. 5, network communication program 538 may alternatively be stored and/or loaded in communication interface 522. For example, network communication program 538 may include and/or represent at least a portion of software and/or firmware that is executed by a processor and/or Application Specific Integrated Circuit (ASIC) incorporated in communication interface 522.

As illustrated in FIG. 5, example computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, additional elements 120 from FIG. 1 may be stored and/or loaded in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 510 may be configured as an Application Specific Integrated Circuit (ASIC) adapted to implement one or more of the example embodiments disclosed herein.

Figure 6:
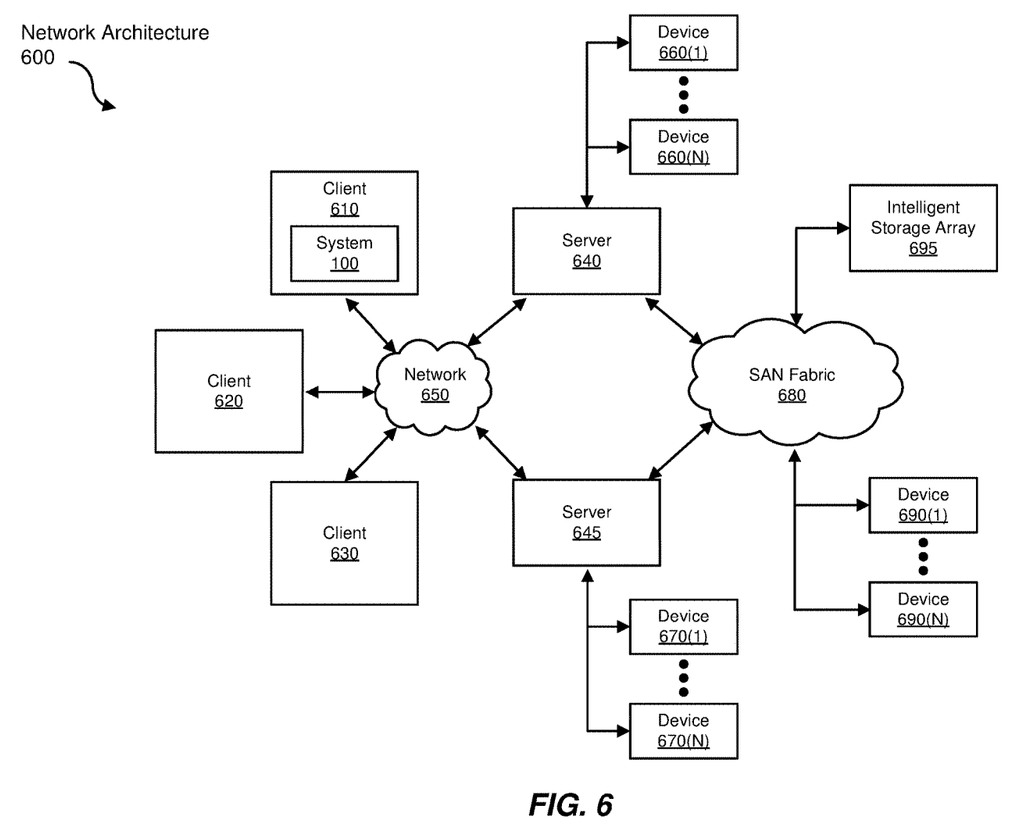
FIG. 6 is a block diagram of an example computing network capable of implementing one or more of the embodiments described and/or illustrated herein.

FIG. 6 is a block diagram of an example network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as example computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to example computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the example embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an example method for protecting data affected by system changes.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive an installation package and transform data from the installation package to a local backup. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for protecting data affected by system changes, at least a portion of the method being performed by a computing device comprising at least one processor, the method comprising:
   receiving, at an installation application, a request to perform a system change on an endpoint computing device;
   identifying, via the installation application, one or more data items currently installed on the endpoint computing device that will be modified when the system change is performed by:
      obtaining one or more packages to be installed as part of the system change;
      identifying a list of data items contained in each of the one or more packages; and
      determining, for each data item within the list of data items, whether the data item already exists on the endpoint computing device;
   using the installation application to protect the currently installed data items such that the system change becomes revertible, wherein protecting the data items comprises creating, on the endpoint device, a container comprising a local backup of the currently installed data items; and
   after protecting the currently installed data items, using the installation application to perform the system change.

2. The method of claim 1, wherein the container further comprises at least one of:
   a list of the currently installed data items; and
   meta-information relating to the currently installed data items.

3. The method of claim 1, wherein, after the installation application creates the container, a third-party backup system installed on the endpoint computing device includes the data items within the container in a general backup in response to obtaining the data items from the container.

4. The method of claim 1, wherein the currently installed data items comprise at least one of:
   a file;
   a data block;
   metadata; and
   system data.

5. The method of claim 1, wherein the request to perform the system change comprises a request to install at least one of:
   new software; and
   an update to existing software.

6. The method of claim 1, wherein identifying the currently installed data items that will be modified when the system change is performed further comprises identifying an RPMDB file located in /var/lib/rpmdb/ based on a policy to always identify the RPMDB file when identifying data items that will be modified by a system change.

7. The method of claim 1, further comprising:
   installing the one or more packages using a dry-run operation that installs the one or more packages in dry-run mode, wherein the dry-run operation returns a list of one or more dependent packages;
   identifying a list of data items contained in each of the one or more dependent packages; and
   determining, for each data item within the list of data items contained in each of the one or more dependent packages, whether the data item already exists on the endpoint computing device.

8. The method of claim 1, wherein identifying the currently installed data items that will be modified when the system change is performed comprises identifying a package installation scriptlet that identifies data items that will be affected by the system change.

9. The method of claim 1, wherein, after the installation application performs the system change, a restoration process reverts the system change by copying each data item within the protected data items to its original location.

10. A system for protecting data affected by installation packages, the system comprising:
 a receiving module, stored in memory, that receives, at an installation application, a request to perform a system change on an endpoint computing device;
 an identification module, stored in memory, that identifies, via the installation application, one or more data items currently installed on the endpoint computing device that will be modified when the system change is performed by:
  obtaining one or more packages to be installed as part of the system change;
  identifying a list of data items contained in each of the one or more packages; and
  determining, for each data item within the list of data items, whether the data item already exists on the endpoint computing device;
 a protection module, stored in memory, that uses the installation application to protect the currently installed data items such that the system change becomes revertible, wherein protecting the data items comprises creating, on the endpoint device, a container comprising a local backup of the currently installed data items;
 a change module, stored in memory, that, after the protection module protects the currently installed data items, uses the installation application to perform the system change; and
 at least one physical processor configured to execute the receiving module, the identification module, the protection module, and the change module.

11. The system of claim 10, wherein t container further comprises at least one of:
 a list of the currently installed data items; and
 meta-information relating to the currently installed data items.

12. The system of claim 10, wherein, after the installation application creates the container, a third-party backup system installed on the endpoint computing device includes the data items within the container in a general backup in response to obtaining the data items from the container.

13. The system of claim 10, wherein the currently installed data items comprise at least one of:
 a file;
 a data block;
 metadata; and
 system data.

14. The system of claim 10, wherein the request to perform the system change comprises a request to install at least one of:

new software; and
an update to existing software.

15. The system of claim 10, wherein the identification module additionally identifies the currently installed data items that will be modified when the system change is performed by identifying an RPMDB file located in /var/lib/rpmdb/ based on a policy to always identify the RPMDB file when identifying data items that will be modified by a system change.

16. The system of claim 10, wherein the identification module identifies the currently installed data items that will be modified when the system change is performed by identifying a package installation scriptlet that identifies data items that will be affected by the system change.

17. The system of claim 10, wherein, after the installation application performs the system change, a restoration process reverts the system change by copying each data item within the protected identified data items to its original location.

18. A non-transitory computer-readable medium comprising one or more computer-readable instructions that, when executed by at least one processor of a computing device, cause the computing device to:
 receive, at an installation application, a request to perform a system change on an endpoint computing device;
 identify, via the installation application, one or more data items currently installed on the endpoint computing device that will be modified when the system change is performed by:
  obtaining one or more packages to be installed as part of the system change;
  identifying a list of data items contained in each of the one or more packages; and
  determining, for each data item within the list of data items, whether the data item already exists on the endpoint computing device;
 use the installation application to protect the currently installed data items such that the system change becomes revertible, wherein protecting the data items comprises creating, on the endpoint device, a container comprising a local backup of the currently installed data items; and
 after protecting the currently installed data items, use the installation application to perform the system change.

19. The non-transitory computer-readable medium of claim 18, wherein the container further comprises at least one of:
 a list of the currently installed data items; and
 meta-information relating to the currently installed data items.

20. The non-transitory computer-readable medium of claim 18, wherein the data items comprise at least one of:
 a file;
 a data block;
 metadata; and
 system data.

* * * * *

UNITED STATES PATENT AND TRADEMARK OFFICE
CERTIFICATE OF CORRECTION

PATENT NO.        : 10,437,683 B1
APPLICATION NO.   : 15/615070
DATED             : October 8, 2019
INVENTOR(S)       : Alex Kois et al.

It is certified that error appears in the above-identified patent and that said Letters Patent is hereby corrected as shown below:

In the Claims

In Column 19, Line 42, Claim 11, delete "t" and insert -- the --, therefor.

Signed and Sealed this
Third Day of December, 2019

Andrei Iancu
*Director of the United States Patent and Trademark Office*